US012470000B2

(12) United States Patent
Nishijima

(10) Patent No.: US 12,470,000 B2
(45) Date of Patent: Nov. 11, 2025

(54) MALE TERMINAL INCLUDING OPENING AND PROJECTING PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Seido Nishijima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 349 days.

(21) Appl. No.: 17/922,918

(22) PCT Filed: Apr. 28, 2021

(86) PCT No.: PCT/JP2021/016881
§ 371 (c)(1),
(2) Date: Nov. 2, 2022

(87) PCT Pub. No.: WO2021/235205
PCT Pub. Date: Nov. 25, 2021

(65) Prior Publication Data

US 2023/0170637 A1 Jun. 1, 2023

(30) Foreign Application Priority Data

May 19, 2020 (JP) ................................ 2020-087252

(51) Int. Cl.
*H01R 13/04* (2006.01)

(52) U.S. Cl.
CPC .................................. *H01R 13/04* (2013.01)

(58) Field of Classification Search
CPC .......................................... H01R 13/04–43/16
See application file for complete search history.

(56) References Cited

U.S. PATENT DOCUMENTS

| | | | |
|---|---|---|---|
| 1,606,293 | A | 11/1926 | Dake |
| 2,813,258 | A | 11/1957 | Klumpp |

(Continued)

FOREIGN PATENT DOCUMENTS

| | | |
|---|---|---|
| JP | S58-168076 U | 11/1983 |
| JP | 2016-024901 A | 2/2016 |

OTHER PUBLICATIONS

International Search Report issued on Jul. 13, 2021 for WO 2021/235205 A1 (6 pages).

*Primary Examiner* — Vanessa Girardi
(74) *Attorney, Agent, or Firm* — Venjuris, P.C.

(57) ABSTRACT

A male terminal of a novel structure is disclosed which can reduce manufacturing cost while suppressing an increase of conductor resistance. A male terminal 10 is provided with a plurality of plate portions 12, 14 made of metal, a plurality of recessed portions 18, 20 respectively provided in the plurality of plate portions 12, 14 and each extending from a tip part toward a base end part of the corresponding plate portion 12, 14 while having an arcuate cross-sectional shape, a tubular contact portion 28 provided by combining the plurality of recessed portions 18, 20, and a conductive connecting portion 30 provided by combining the base end parts of the plurality of plate portions 12, 14.

4 Claims, 5 Drawing Sheets

(56) References Cited

U.S. PATENT DOCUMENTS

| | | | | |
|---|---|---|---|---|
| 3,134,632 | A | 5/1964 | Kimball et al. | |
| 3,397,383 | A * | 8/1968 | Prifogle ............... | H01R 13/055 439/825 |
| 3,506,950 | A | 4/1970 | Klumpp et al. | |
| 10,230,194 | B2 * | 3/2019 | Akagi .................. | H01R 13/447 |
| 2002/0064986 | A1 | 5/2002 | Hirai et al. | |
| 2011/0045711 | A1 | 2/2011 | Thoerner | |
| 2015/0126078 | A1 | 5/2015 | Kawamura et al. | |

* cited by examiner

MALE TERMINAL INCLUDING OPENING AND PROJECTING PORTION

CROSS REFERENCE TO RELATED APPLICATIONS

This application is a national phase of PCT application No. PCT/JP2021/016881, filed on 28 Apr. 2021, which claims priority from Japanese patent application No. 2020-087252, filed on 19 May 2020, all of which are incorporated herein by reference.

TECHNICAL FIELD

The present disclosure relates to a male terminal.

BACKGROUND

Patent Document 1 discloses a male terminal including a substantially cylindrical contact portion to be inserted into and conductively connected to a tubular female terminal. The substantially cylindrical contact portion of such a male terminal has advantages of being easily inserted between resilient contact pieces arranged to face each other inside the female terminal, easily securing a conductor cross-sectional area and easily reducing conductor resistance.

PRIOR ART DOCUMENT

Patent Document

Patent Document 1: JP 2016-024901 A

SUMMARY OF THE INVENTION

Problems to be Solved

Since the male terminal including the substantially cylindrical contact portion is fabricated by forging or cutting, there has been an inherent problem that manufacturing cost is high. Further, partial plating needs to be applied to the contact portion to be brought into contact with the resilient contact pieces of the female terminal, which leads to a further cost increase.

Accordingly, a male terminal of a novel structure is disclosed which can reduce manufacturing cost while suppressing an increase of conductor resistance.

Means to Solve the Problem

The present disclosure is directed to a male terminal with a plurality of plate portions made of metal, a plurality of recessed portions respectively provided in the plurality of plate portions, each recessed portion extending from a tip part toward a base end part of the corresponding plate portion while having an arcuate cross-sectional shape, a tubular contact portion provided by combining the plurality of recessed portions, and a conductive connecting portion provided by combining the base end parts of the plurality of plate portions, and an insulating cap being detachably attached to cover a tip part of the contact portion.

Effect of the Invention

According to the present disclosure, it is possible to provide a male terminal of a novel structure capable of reducing manufacturing cost while suppressing an increase of conductor resistance.

DETAILED DESCRIPTION TO EXECUTE THE INVENTION

Description of Embodiments of Present Disclosure

Figure 1:
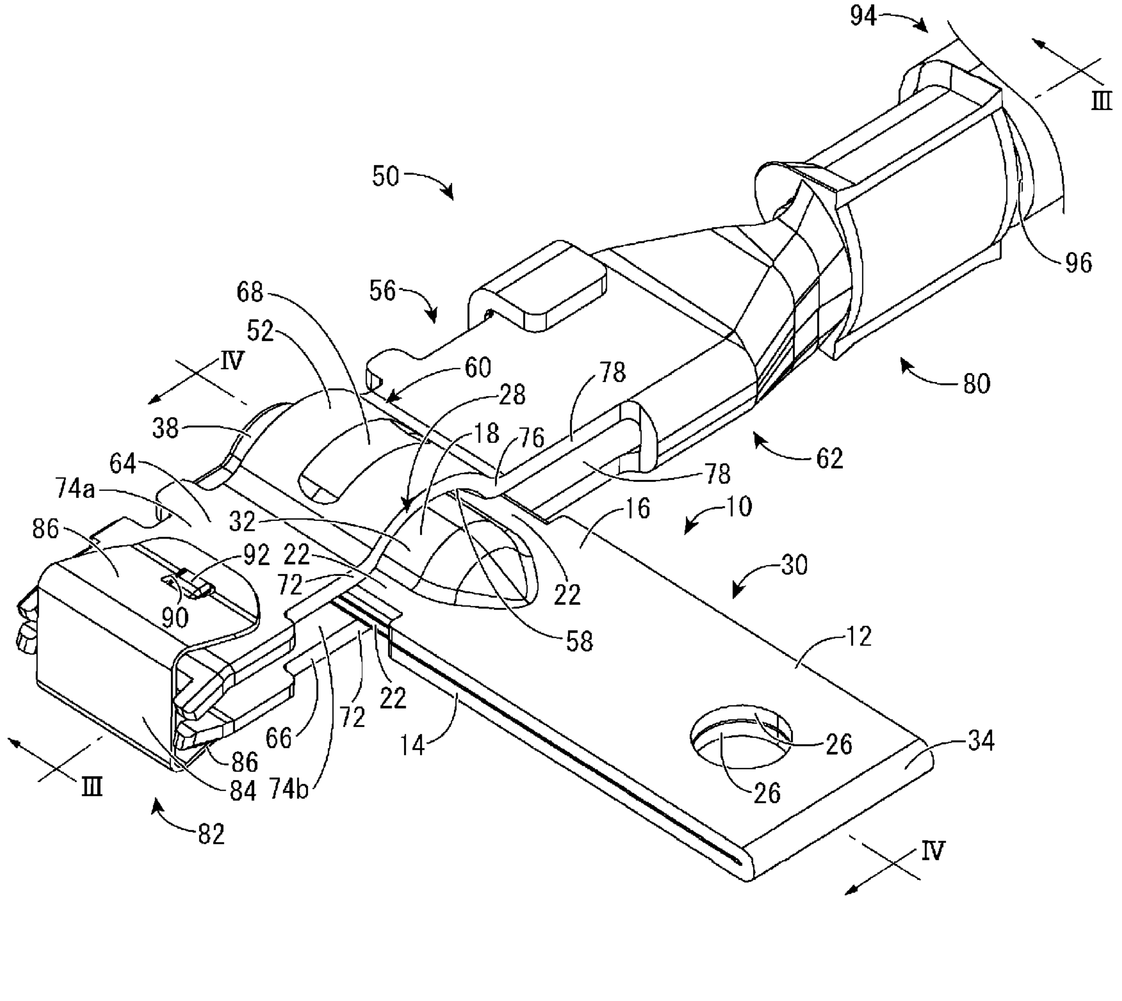
FIG. 1 is an overall perspective view showing a state where a male terminal according to a first embodiment is conductively connected to a female terminal.

First, embodiments of the present disclosure are listed and described.

(1) The male terminal of the present disclosure is provided with a plurality of plate portions made of metal, a plurality of recessed portions respectively provided in the plurality of plate portions, each recessed portion extending from a tip part toward a base end part of the corresponding plate portion while having an arcuate cross-sectional shape, a tubular contact portion provided by combining the plurality of recessed portions, and a conductive connecting portion provided by combining the base end parts of the plurality of plate portions, and an insulating cap being detachably attached to cover a tip part of the contact portion.

According to the male terminal of the present disclosure, the plurality of plate portions are combined, and each plate portion includes the recessed portion extending from the tip part toward the base end part while having an arcuate cross-sectional shape. The tubular contact portion of the male terminal is formed by combining the plurality of recessed portions, and the conductive connecting portion is formed by combining a plurality of the base end parts. In this way, the tubular contact portion, which has been conventionally manufactured by forging or cutting, can be manufactured by press-stamping a strip material, and manufacturing cost can be reduced.

Further, since the conductive connecting portion and the contact portion are configured by combining the plurality of plate portions, a conductor cross-sectional area can be advantageously secured and conductor resistance can be reduced. Therefore, a male terminal applicable to the use of large currents can be provided at a low cost. In addition, the contact portion can be plated in the stage of the strip material and manufacturing cost can be further reduced as compared to the case where partial plating is individually performed after a cylindrical contact portion is manufactured by cutting or the like.

(2) Preferably, the plurality of plate portions include a first plate portion and a second plate portion, the recessed portions include an arcuate first recessed portion provided in the first plate portion and an arcuate second recessed portion provided in the second plate portion, and the round tubular contact portion is formed on the tip part sides of the first and second plate portions and the flat plate-like conductive connecting portion is formed on the base end part sides of the first and second plate portions by overlapping the first and second plate portions in a plate thickness direction. This is because the round tubular contact portion and the flat plate-like conductive connecting portion can be easily manufactured with a good yield by overlapping the first and second plate portions. Note that the arcuate first/second recessed portion needs not necessarily be curved at a fixed curvature in a circumferential direction and may be a recessed portion curved to have half the circumferential length of the contact portion as a whole while having a curvature changing in the circumferential direction. Therefore, the round tubular contact portion also needs not necessarily have a true circular cross-section and may have a round tubular shape as a whole while having a curvature changing in the circumferential direction.

(3) Preferably, in (2) above, the base end part side of the first plate portion and the base end part side of the second plate portion are coupled via a coupling portion. Since the base end part sides of the first and second plate portions are coupled via the coupling portion, the male terminal is easily handled. Further, since the first plate portion, the second plate portion and the coupling portion can be integrally provided by forming the recessed portions in both end parts in a longitudinal direction of a long flat plate, thereafter, bending the flat plate in a central part and overlapping the both end parts, manufacturing efficiency can also be improved. Note that the coupling portion may be constituted by crimping pieces for crimping the first and second plate portions to each other or a welding portion for welding the first and second plate portions to each other.

(4) This paragraph is deleted.

(5) The male terminal of the present disclosure is provided with a plurality of plate portions made of metal, a plurality of recessed portions respectively provided in the plurality of plate portions, each recessed portion extending from a tip part toward a base end part of the corresponding plate portion while having an arcuate cross-sectional shape, a tubular contact portion provided by combining the plurality of recessed portions, a conductive connecting portion provided by combining the base end parts of the plurality of plate portions and a pair of projecting portions projecting on both sides in a direction perpendicular to an axis of the contact portion. Since the pair of projecting portions projecting on the both sides in the direction perpendicular to the axis of the contact portion are provided, it is possible to prevent a rotational displacement of the male terminal with respect to a female terminal and advantageously improve connection stability between the male and female terminals by engaging the pair of projecting portions with the female terminal. Particularly, in the case of including the insulating cap, the pair of projecting portions can be provided with engaging portions with the insulating cap and the insulating cap can be attached without reducing a conductor cross-sectional area of the contact portion.

Details of Embodiments of Present Disclosure

Specific examples of a male terminal of the present disclosure are described below with reference to the drawings. Note that the present disclosure is not limited to these illustrations and is intended to be represented by claims and include all changes in the scope of claims and in the meaning and scope of equivalents.

First Embodiment

Hereinafter, a first embodiment of the present disclosure is described with reference to FIGS. 1 to 5. A male terminal 10 includes a first plate portion 12 and a second plate portion 14 made of metal. The male terminal 10 is formed by overlapping the first plate portion 12 on the second plate portion 14 from above in a plate thickness direction. Note that, for a plurality of identical members, only some members may be denoted by a reference sign and the other members may not be denoted by the reference sign below.

<First Plate Portion 12 and Second Plate Portion 14>

Figure 5:
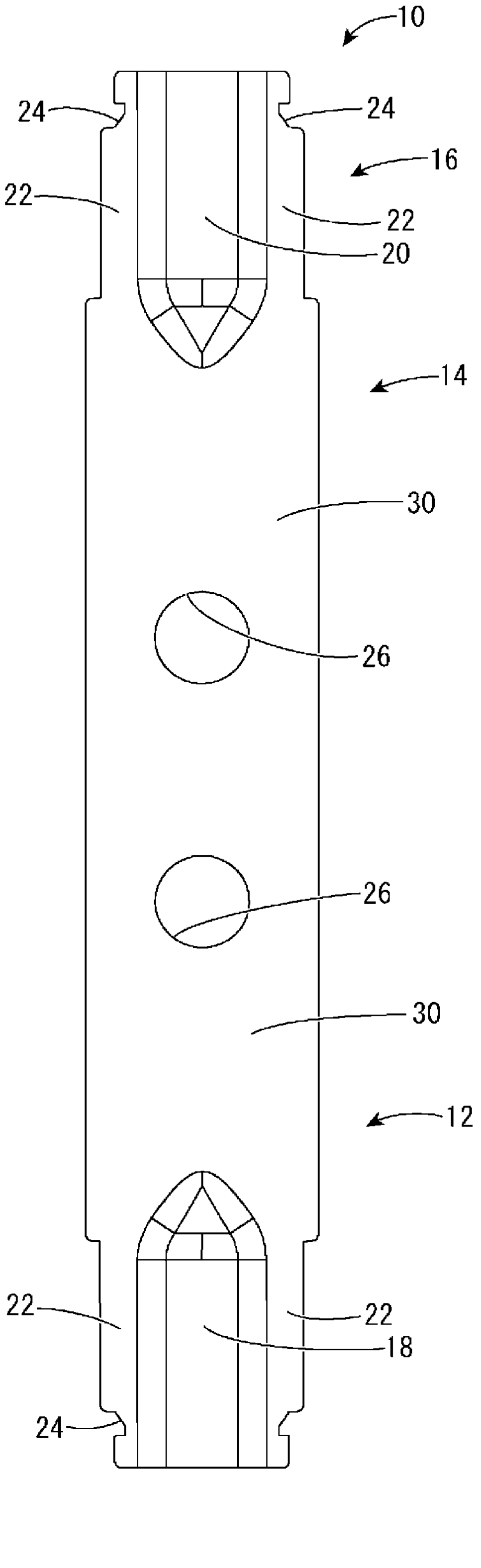
FIG. 5 is a development of the male terminal shown in FIG. 2.

As shown in FIG. 5, the male terminal 10 is formed by press-working a strip-like metal flat plate 16 into a predetermined shape. A metal low in electrical resistance such as copper, copper alloy, aluminum or aluminum alloy can be appropriately selected as a metal constituting the metal flat plate 16. More particularly, the male terminal 10 of this embodiment is formed by folding the first plate portion 12 formed on one end side (lower side in FIG. 5) in a longitudinal direction of the press-worked metal flat plate 16 and overlapping the first plate portion 12 on the second plate portion 14 formed on the other end side (upper side in FIG. 5). Parts folded into contact such as projecting portions 22 and a conductive connecting portion 30 to be described later are partially fixed by a known technique such as welding.

<First Recessed Portion 18 and Second Recessed Portion 20>

Figure 3:
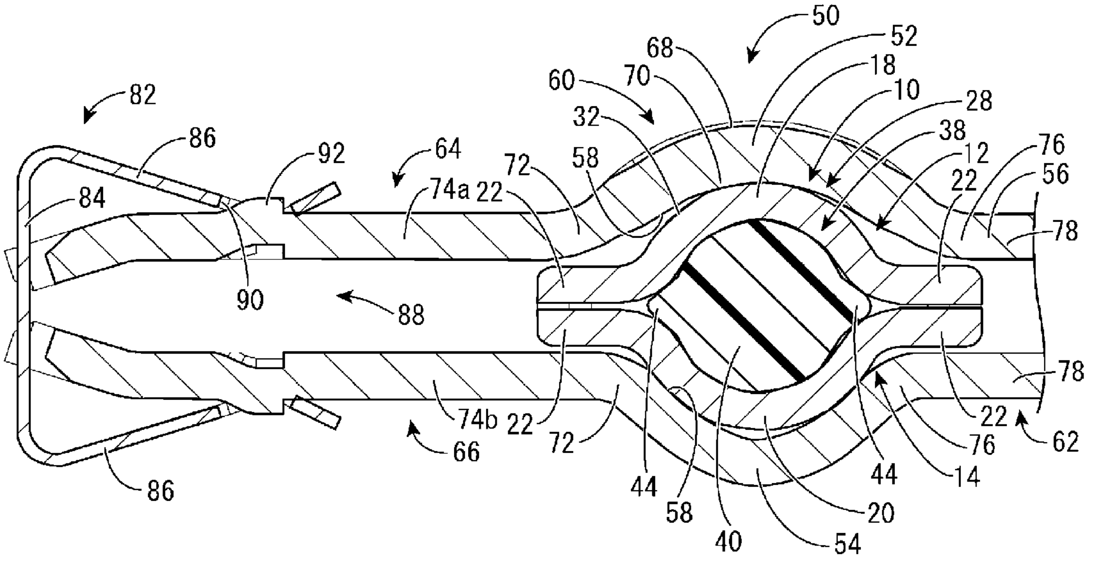
FIG. 3 is an enlarged section along III-III in FIG. 1.

In the press-worked metal flat plate 16, both end sides in the longitudinal direction (vertical direction in FIG. 5) are somewhat narrower than a central part. A central part in a width direction (lateral direction in FIG. 5) of this narrow part projects downward (downward in a direction perpendicular to the plane of FIG. 5) in a dome-like manner. In this way, an arcuate first recessed portion 18 constituting a recessed portion extends from a tip part (lower end part in FIG. 5) to a base end part (central part in FIG. 5) of the first plate portion 12 in the first plate portion 12. An arcuate second recessed portion 20 constituting the recessed portion extends from a tip part (upper end part in FIG. 5) to a base end part (central part in FIG. 5) of the second plate portion 14 in the second plate portion 14. As shown in FIG. 3, the first and second recessed portions 18, 20 are formed such that a curvature of a central part in a circumferential direction is smaller than those of both end parts in the circumferential direction, and form inner peripheral surfaces smoothly continuous without a bending point.

<Projecting Portions 22 and Cut Portions 24>

A pair of the projecting portions 22, 22 in the form of rectangular flat plates projecting outward in the width direction are provided on end parts in the width direction (lateral direction in FIG. 5) of each of the first and second recessed portions 18, 20. Further, cut portions 24 having a trapezoidal cross-sectional shape and open outward in the width direction are provided on end sides in the longitudinal direction of the pair of projecting portions 22, 22. In addition, a pair of bolt insertion holes 26, 26 having a circular cross-sectional shape are formed in a central part in the longitudinal direction of the metal flat plate 16 while being separated in the longitudinal direction.

<Contact Portion 28 and Conductive Connecting Portion 30>

Figure 2:
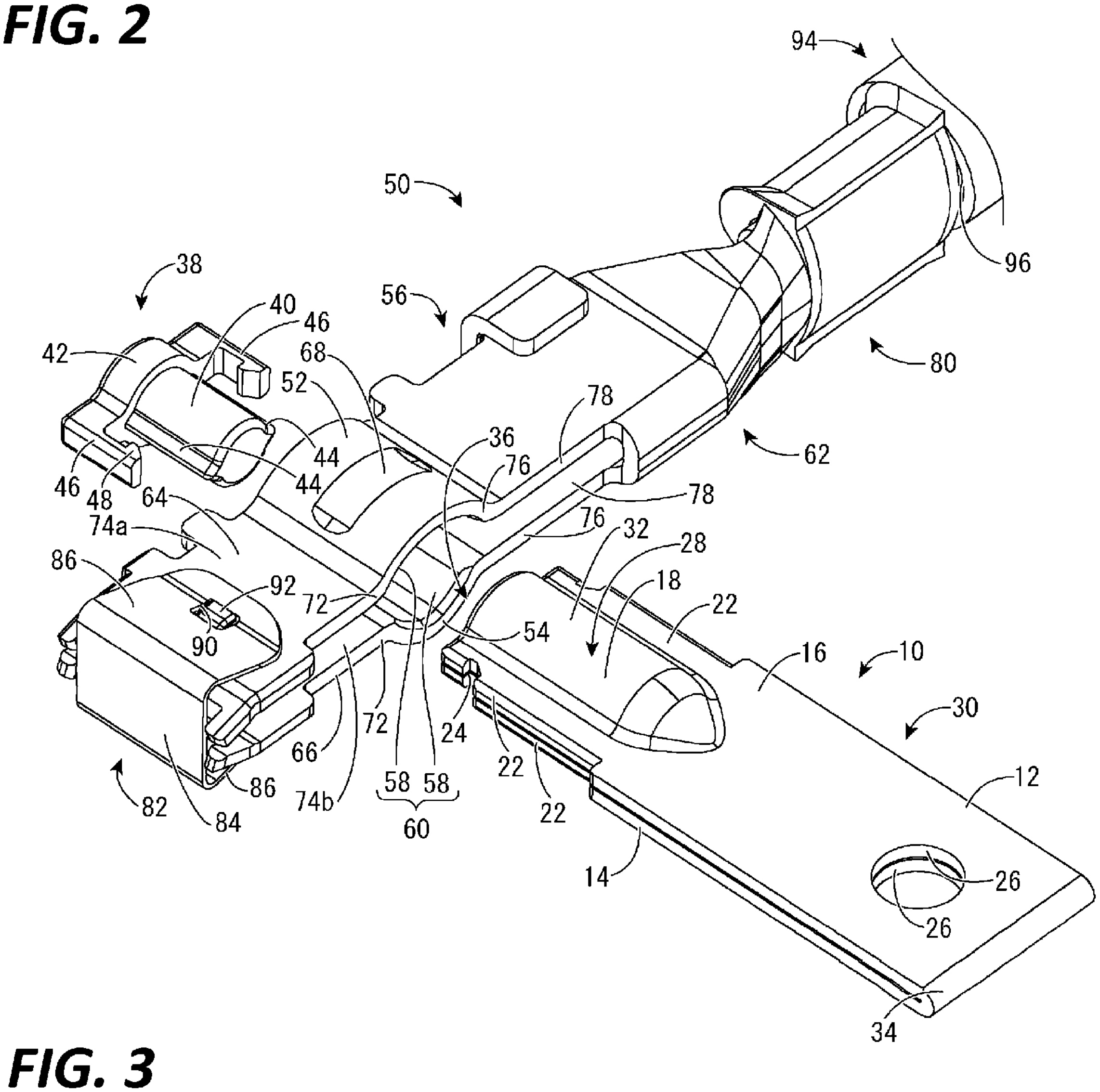
FIG. 2 is an exploded perspective view of FIG. 1.

The male terminal 10 of this embodiment is formed by folding and overlapping the first plate portion 12 formed on the one end side (lower side in FIG. 5) of the metal flat plate 16 on the second plate portion 14 formed on the other end side (upper side in FIG. 5). As shown in FIG. 2, by overlapping the first and second plate portions 12, 14 in the plate thickness direction, a round tubular contact portion 28 having no bending point in the circumferential direction is formed on tip part sides (left upper sides in FIG. 2) of the first and second plate portions 12, 14, and a flat plate-like conductive connecting portion 30 is formed on base end part sides (right lower sides in FIG. 2). That is, the male terminal 10 is provided with the round tubular contact portion 28 by combining the first and second recessed portions 18, 20 and the conductive connecting portion 30 by combining base end parts (right lower parts in FIG. 2) of the first and second plate portions 12, 14. Note that an outer surface 32 of the contact portion 28 of the male terminal 10 is connected to a tubular connecting portion 60 of a female terminal 50 to be described later, whereby the male terminal 10 and the female terminal 50 are conductively connected. Further, an unillustrated mating terminal is bolt-fastened and conductively connected to the conductive connecting portion 30 of the male terminal 10, whereby the male terminal 10 and the mating terminal are conductively connected.

<Coupling Portion 34>

As a result of the above, in the male terminal 10 of this embodiment, the base end part side (right lower side in FIG. 2) of the first plate portion 12 and the base end part side (right lower side in FIG. 2) of the second plate portion 14 are coupled via a coupling portion 34. Further, the pairs of projecting portions 22, 22 provided on the first and second plate portions 12, 14 are respectively overlapped in the plate thickness direction and project toward both sides in a direction perpendicular to an axis of the contact portion 28. The cut portions 24 are overlapped on the tip part sides (left upper sides in FIG. 2) of the pairs of overlapped projecting portions 22, 22.

<Insulating Cap 38>

As shown in FIGS. 1 to 4, an insulating cap 38 made of synthetic resin is fit in an opening 36 of the contact portion 28 of the male terminal 10. More particularly, the insulating cap 38 for covering a tip part (left upper end part in FIG. 2) of the contact portion 28 of the male terminal 10 is detachably attached to this tip part. The insulating cap 38 has a cylindrical shape, one side thereof serves as a small-diameter portion 40, whereas the other side thereof serves as a large-diameter portion 42 having a larger diameter than the small-diameter portion 40. A pair of ridges 44, 44 projecting outward in a radial direction, having a triangular cross-sectional shape and extending in an axial direction are provided on parts of the outer peripheral surface of the small-diameter portion 40 facing each other in the radial direction (lateral direction in FIG. 3) (see FIG. 2). Engaging portions 46 extending in projecting directions of the pair of ridges 44, 44 provided on the small-diameter portion 40 and extending toward the small-diameter portion 40 along an axial direction of the small-diameter portion 40 after moving beyond the ridges 44 are provided on parts of the outer peripheral surface of the large-diameter portion 42 facing each other in a radial direction (see FIG. 2). Engaging projections 48 having a trapezoidal cross-sectional shape and projecting toward the small-diameter portion 40 are formed on tip parts of the engaging portions 46.

In fitting the insulating cap 38 into the opening 36 of the contact portion 28 of the male terminal 10, the small-diameter portion 40 of the insulating cap 38 is first oriented toward the opening 36 of the contact portion 28 of the male terminal 10. Subsequently, the insulating cap 38 is so inserted into the contact portion 28 that the pair of ridges 44, 44 of the small-diameter portion 40 enter gaps between the pairs of projecting portions 22, 22 of the contact portion 28 of the male terminal 10. In this way, the insulating cap 38 is guided by the pair of ridges 44, 44 and inserted into the contact portion 28 of the male terminal 10 until the engaging projections 48 provided on the engaging portions 46 of the insulating cap 38 are engaged with the cut portions 24 provided in the projecting portions 22 of the male terminal 10. As a result, as shown in FIG. 3, the outer peripheral surface of the small-diameter portion 40 of the insulating cap 38 are held in close contact with the inner peripheral surface of the contact portion 28 of the male terminal 10 and the pair of ridges 44, 44 are held in the gaps between the pairs of projecting portions 22, 22 of the contact portion 28 of the male terminal 10. Further, the engaging projections 48 of the insulating cap 38 are engaged with the cut portions 24 provided in the projecting portions 22 of the male terminal 10. Moreover, the large-diameter portion 42 of the insulating cap 38 is in contact with a peripheral edge part of the opening 36 of the contact portion 28 of the male terminal 10 (see FIG. 4). In this way, the insulating cap 38 is stably held in the contact portion 28 of the male terminal 10 without rattling.

<Female Terminal 50>

As shown in FIGS. 1 to 4, the male terminal 10 thus configured is connected to the female terminal 50. The female terminal 50 has a female terminal fitting 56 including a first peripheral wall portion 52 and a second peripheral wall portion 54 arranged to face each other. The female terminal fitting 56 is formed with the tubular connecting portion 60 to be conductively connected to the contact portion 28 of the male terminal 10 by inner surfaces 58 of the first and second peripheral wall portions 52, 54.

<First Peripheral Wall Portion 52 and Second Peripheral Wall Portion 54>

Figure 4:
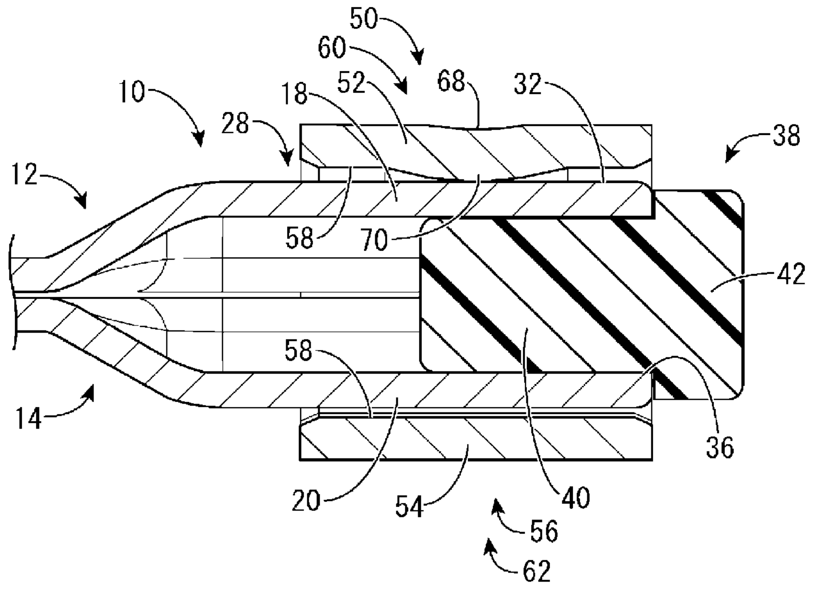
FIG. 4 is an enlarged section along IV-IV in FIG. 1.

As shown in FIGS. 1 and 4, the female terminal fitting 56 is formed by press-working a strip-like metal flat plate 62 into a predetermined shape. A metal low in electrical resistance such as copper, copper alloy, aluminum or aluminum alloy can be appropriately selected as a metal constituting the metal flat plate 62. In this embodiment, the strip-like metal flat plate 62 is folded into two and one end part 64 in a length direction is overlapped above another end part 66 (lower side in FIG. 3). By curving intermediate parts in the length direction of overlapping surfaces in directions separating from each other with the one end part 64 folded and overlapped above the other end part 66, the substantially hollow cylindrical tubular connecting portion 60 is formed. Note that the tubular connecting portion 60 is so configured that the male terminal 10 is press-fit thereinto.

As shown in FIGS. 1 to 4, a recess 68 having a rectangular cross-sectional shape in a plan view is provided in a central part in the width direction of the outer surface of the first peripheral wall portion 52. An arcuate protrusion 70 having an arcuate cross-sectional shape and projecting radially inward in a cross-section in the length direction (see FIG. 3) and a cross-section in the width direction (see FIG. 4) is formed on the outer surface of the first peripheral wall portion 52 by the recess 68. Therefore, the tubular connecting portion 60 of the female terminal 50 can be reliably conductively connected to the contact portion 28 of the male terminal 10.

The tubular connecting portion 60 is formed by the first and second peripheral wall portions 52, 54 arranged to face each other. In this way, for example, as shown in FIG. 3, a pair of overlapping plate portions 74*a*, 74*b* projecting outward (leftward in FIG. 3) while being separated from each other are respectively connected to a pair of first peripheral end parts 72, 72 facing each other in the first and second peripheral wall portions 52, 54. A pair of extending plate portions 78, 78 connected to a pair of second peripheral end parts 76, 76 and projecting outward (rightward in FIG. 3) are respectively provided on a pair of second peripheral end parts 76, 76. A wire connecting portion 80 is configured by overlapping the pair of extending plate portions 78, 78 each other.

<Clip 82>

A clip 82 is mounted on the pair of overlapping plate portions 74*a*, 74*b* (see FIGS. 1 to 3). The clip 82 is formed using a strip plate made of one of various metal materials, which can be press-worked or stamped, such as spring steel, stainless steel, brass, phosphor bronze and beryllium copper. The clip 82 includes a coupling plate portion 84 in the form of a rectangular flat plate and a pair of sandwiching plate portions 86, 86 in the form of rectangular flat plates projecting in directions toward each other from both side edge parts of the coupling plate portion 84. Projecting end parts of the pair of sandwiching plate portions 86, 86 are slightly bent in directions separating from each other. A gap between closest parts of the projecting end parts of the pair of sandwiching plate portions 86, 86 serves as an insertion opening 88. Lock holes 90 having a rectangular cross-sectional shape are provided to penetrate through central parts in the width direction of the pair of sandwiching plate portions 86, 86 in the insertion opening 88.

Further, lock claws 92 having a substantially triangular cross-sectional shape project respectively on the upper surface of the overlapping plate portion 74*a* and the lower surface of the overlapping plate portion 74*b* in central parts in the width direction of the pair of overlapping plate portions 74*a*, 74*b* in the insertion opening 88. In addition, extending end parts of the pair of extending plate portions 78, 78 are connected to the wire connecting portion 80. In the wire connecting portion 80, a core wire 96 of a wire 94 is conductively connected to the female terminal fitting 56 using a known crimping technique.

The clip 82 is press-fit onto tip parts (left sides in FIG. 3) in projecting directions of the pair of overlapping plate portions 74*a*, 74*b* of the female terminal fitting 56 from the insertion opening 88. At this time, the pair of sandwiching plate portions 86, 86 are resiliently deformed in directions separating from each other to ride over the lock claws 92 provided on the pair of overlapping plate portions 74*a*, 74*b*. Thereafter, the pair of sandwiching plate portions 86, 86 resiliently return, whereby the lock claws 92 are fit into the lock holes 90 provided in the pair of sandwiching plate portions 86, 86 and the clip 82 is unremovably held on the female terminal fitting 56. In this way, the clip 82 can be held on the pair of overlapping plate portions 74*a*, 74*b* of the female terminal fitting 56 by a simple structure of fitting the lock claws 92 into the lock holes 90. Further, the pair of overlapping plate portions 74*a*, 74*b* are biased into a state overlapping each other between the pair of sandwiching plate portions 86, 86 by resilient restoring forces of the pair of sandwiching plate portions 86, 86.

According to the male terminal 10 of the present disclosure structured as just described, the male terminal 10 is formed by overlapping the first plate portion 12 on the second plate portion 14 from above in the plate thickness direction. The contact portion 28 of the male terminal 10 is formed by combining the first recessed portion 18 provided in the first plate portion 12 and the second recessed portion 20 provided in the second plate portion 14, and the conductive connecting portion 30 is provided by combining the base end parts of the first and second plate portions 12, 14. In this way, a contact portion, which has been conventionally manufactured by forging or cutting, can be manufactured by press-stamping a strip material. Therefore, manufacturing cost can be reduced. Further, since the male terminal 10 is formed using the first and second plate portions 12, 14, a total plate thickness can be increased as compared to the case of forming a male terminal using one plate portion. Thus, a large conductor cross-sectional area can be easily secured and conductor resistance can be easily reduced. Further, the contact portion conventionally manufactured by forging or cutting can be plated in the stage of the strip material. That is, manufacturing cost can be further reduced as compared to the case where partial plating is individually performed after the cylindrical contact portion is manufactured by cutting or the like. In addition, the male terminal 10 including the round tubular contact portion 28 and the flat plate-like conductive connecting portion 30 by overlapping the first plate portion 12 on the second plate portion 14 from above in the plate thickness direction can be easily manufactured with a good yield.

Since the base end part side (right lower side in FIG. 2) of the first plate portion 12 and the base end part side (right lower side in FIG. 2) of the second plate portion 14 are coupled via the coupling portion 34, the male terminal 10 is easily handled. Further, the male terminal 10 is formed by forming the first and second recessed portions 18, 20 in both end parts in the longitudinal direction of the strip-like metal flat plate 16, bending the metal flat plate 16 in a central part and overlapping the both end parts. In this way, the first plate portion 12, the second plate portion 14 and the coupling portion 34 can be integrally formed. Therefore, manufacturing efficiency can be improved.

As shown in FIG. 3, the pairs of projecting portions 22, 22 of the male terminal 10 project on the both sides in the direction perpendicular to the axis of the contact portion 28. In this way, the pairs of the projecting portions 22, 22 contact the first peripheral end parts 72, 72 and the second peripheral end parts 76, 76 of the female terminal 50, whereby a rotational displacement of the contact portion 28 of the male terminal 10 with respect to the tubular connecting portion 60 of the female terminal 50 is prevented. Therefore, good connection stability is ensured between the male terminal 10 and the female terminal 50. Particularly, in the case of including the insulating cap 38, the pairs of projecting portions 22, 22 can be provided with the cut portions 24 engageable with the engaging projections 48 of the insulating cap 38 (see FIG. 2). Therefore, the insulating cap 38 can be mounted without reducing a contact area between the contact portion 28 of the male terminal 10 and the tubular connecting portion 60 of the female terminal 50.

Since the insulating cap 38 is detachably attachable to the tip part of the contact portion 28 of the male terminal 10, a function of preventing an electric shock caused by hand touch can be achieved even in the case of using the male terminal 10 of the first embodiment for high-voltage applications. Further, since the insulating cap 38 is separate from the contact portion 28 of the male terminal 10, manufacturing cost can be reduced as compared to the case where an insulating cap is formed integrally to a male terminal as before.

Second Embodiment

Figure 6:
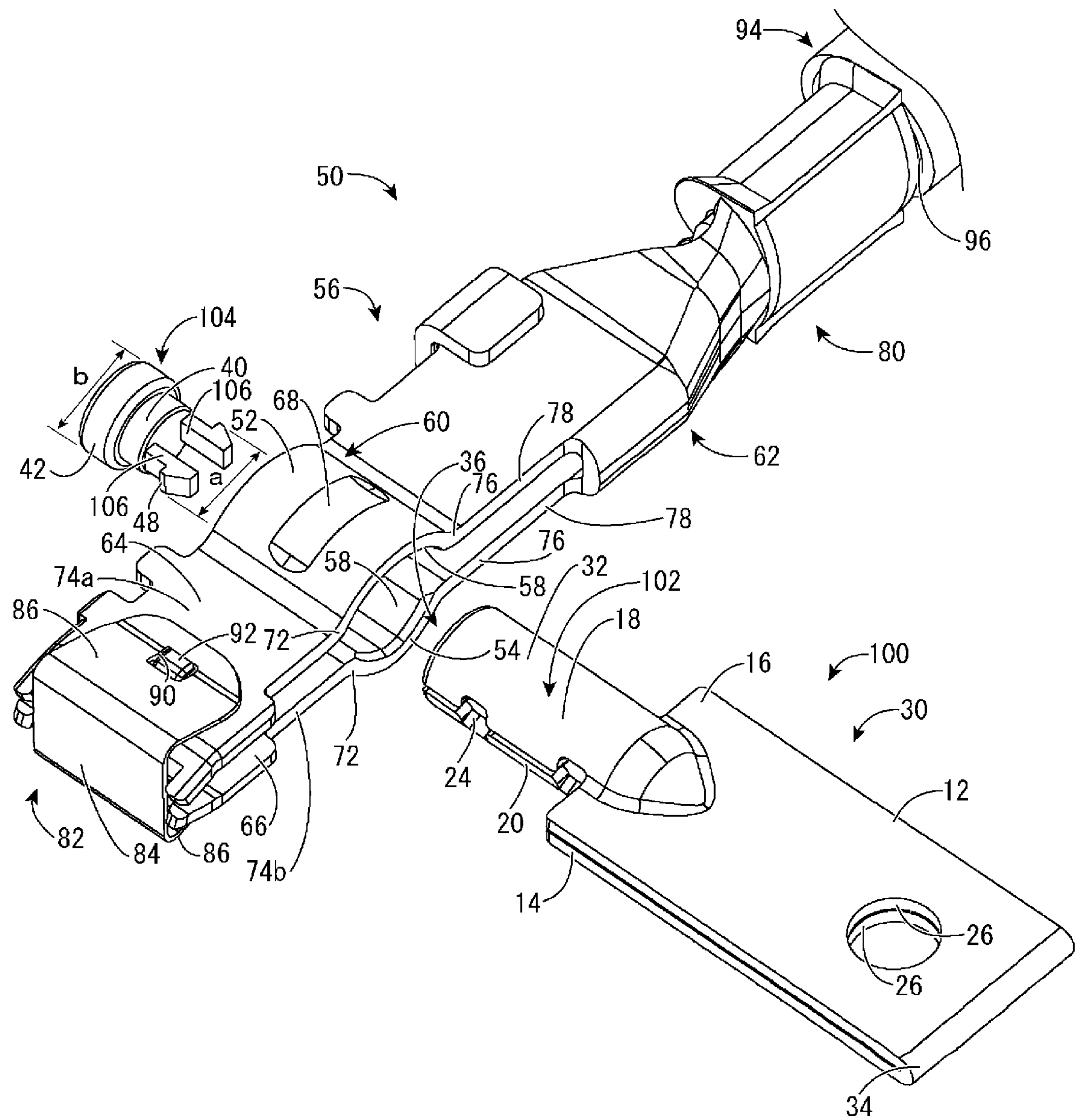
FIG. 6 is an exploded perspective view, corresponding to FIG. 2, of a male terminal according to a second embodiment.

Although the pairs of projecting portions 22, 22 projecting on the both sides in the direction perpendicular to the axis of the contact portion 28 of the male terminal 10 are included in the above first embodiment, there is no limitation to this. A second embodiment of the present disclosure is described with reference to FIG. 6. A male terminal 100 of the second embodiment of the present disclosure does not include pairs of projecting portions projecting on both sides in a direction perpendicular to an axis of a contact portion 102. Since the structure of the male terminal 100 can be simplified in this way, the male terminal 100 can be easily manufactured at a low cost. Further, since the projecting portions are not included, the male terminal 100 of the second embodiment can be applied to more types of female terminals.

In addition, in the second embodiment, a maximum dimension a between outer sides of a pair of engaging portions 106, 106 of an insulating cap 104 is smaller than a maximum outer diameter b of a large-diameter portion 42 of the insulating cap 104 (a<b). Therefore, as compared to the first embodiment, a contact portion 102 of the male terminal 100 having the insulating cap 104 mounted therein can be formed more compactly, and the joint of the male terminal 100 and a female terminal 50 can be realized more compactly.

Other Embodiments

The technique described in this specification is not limited to the above described and illustrated embodiments. For example, the following embodiments are also included in the technical scope of the technique described in this specification.

(1) As shown in FIG. 3, in the first embodiment, the first peripheral wall portion 52 of the male terminal 50 is electrically connected to the contact portion 28 of the male terminal 10 at one position of the inner surface 58. Further, the second peripheral wall portion 54 of the female terminal 50 is electrically connected to the contact portion 28 of the male terminal 10 at two positions of the inner surface 58. However, there is no limitation to this. For example, the contact portion 28 of the male terminal 10 may be electrically connected to the inner surface 58 of each of the first and second peripheral wall portions 52, 54 of the female terminal 50 at one position or at two positions. In addition, the shape of the contact portion 28 of the male terminal 10 is not limited to the round tubular shape. For example, the contact portion 28 may have a polygonal cross-sectional shape such as a rhombic cross-sectional shape or may have a hollow cylindrical shape having a constant curvature in the circumferential direction.

(2) Although the conductive connecting portion 30 and the projecting portions 22 of the male terminal 10 are fixed by welding in the above first embodiment, there is no limitation to this and these may be fixed by a known technique such as crimping using unillustrated crimping pieces or mechanical clinching.

(3) Although the male terminal 10, 100 includes two plate portions composed of the first plate portion 12 and the second plate portion 14 in the above first and second embodiments, there is no limitation to this. A male terminal may include three or more plate portions and a contact portion may be formed by combining recessed portions provided in the three or more plate portions. In this way, the contact portion having a more complicated structure can be easily formed. Further, a conductive connecting portion may be formed by combining base end parts of the three or more plate portions.

(4) Although the base end part sides of the first and second plate portions 12, 14 are coupled via the coupling portion 34 in the male terminal 10, 100 in the above first and second embodiments, there is no limitation to this and the first and second plate portions 12, 14 may be separate bodies.

(5) Although the insulating cap 38, 104 is detachably attached to the male terminal 10, 100 in the above first and second embodiments, there is no limitation to this. The insulating cap 38, 104 may be configured integrally to the male terminal 10, 100 by a known means such as molding.

LIST OF REFERENCE NUMERALS

10 male terminal (first embodiment)
12 first plate portion (plate portion)
14 second plate portion (plate portion)
16 metal flat plate
18 first recessed portion (recessed portion)
20 second recessed portion (recessed portion)
22 projecting portion
24 cut portion
26 bolt insertion hole
28 contact portion
30 conductive connecting portion
32 outer surface
34 coupling portion
36 opening
38 insulating cap
40 small-diameter portion
42 large-diameter portion
44 ridge
46 engaging portion
48 engaging projection
50 female terminal
52 first peripheral wall portion
54 second peripheral wall portion
56 female terminal fitting
58 inner surface
60 tubular connecting portion
62 metal flat plate
64 one end part
66 other end part
68 recess
70 arcuate protrusion
72 first peripheral end part
74*a* overlapping plate portion
74*b* overlapping plate portion
76 second peripheral end part
78 extending plate portion
80 wire connecting portion
82 clip (biasing means)
84 coupling plate portion
86 sandwiching plate portion
88 insertion opening
90 lock hole
92 lock claw
94 wire
96 core wire
100 male terminal (second embodiment)
102 contact portion
104 insulating cap
106 engaging portion

What is claimed is:

1. A male terminal, comprising:

a plurality of plate portions made of metal;

a plurality of recessed portions respectively provided in the plurality of plate portions, each recessed portion extending from a tip part toward a base end part of the corresponding plate portion while having an arcuate cross-sectional shape;

a tubular contact portion provided by combining the plurality of recessed portions and including an opening between the plurality of recessed portions;

a conductive connecting portion provided by combining the base end parts of the plurality of plate portions, and an insulating cap being detachably attached to cover a tip part of the contact portion, wherein a portion of the insulating cap is fitted into the opening of the contact portion.

2. The male terminal of claim 1, wherein the insulating cap includes a first portion and a second portion having a diameter smaller than that of the first portion, and the second portion serving as the portion is fitted into the opening of the contact portion.

3. The male terminal of claim 1, wherein:

the plurality of plate portions include a first plate portion and a second plate portion, the recessed portions include an arcuate first recessed portion provided in the first plate portion and an arcuate second recessed portion provided in the second plate portion, and the tubular contact portion is formed on the tip part sides of the first and second plate portions and the conductive connecting portion having a flat plate shape is formed on the base end part sides of the first and second plate portions by overlapping the first and second plate portions in a plate thickness direction.

4. The male terminal of claim 3, wherein the base end part side of the first plate portion and the base end part side of the second plate portion are coupled via a coupling portion.

* * * * *